United States Patent
Lin

(10) Patent No.: US 8,672,645 B2
(45) Date of Patent: Mar. 18, 2014

(54) SEPARATION TYPE PNEUMATIC DUAL PARTITION MEMBRANE PUMP AND EXTERNAL PNEUMATIC CONTROL VALVE THEREOF

(75) Inventor: Cheng-Wei Lin, Taoyuan (TW)

(73) Assignee: Dino Technology Co., Ltd., Taoyuan County (TW)

( * ) Notice: Subject to any disclaimer, the term of this patent is extended or adjusted under 35 U.S.C. 154(b) by 383 days.

(21) Appl. No.: 13/239,669

(22) Filed: Sep. 22, 2011

(65) Prior Publication Data

US 2013/0078121 A1 Mar. 28, 2013

(51) Int. Cl.
*F04B 45/00* (2006.01)
*F04B 45/02* (2006.01)
*F04B 43/06* (2006.01)
*F16K 11/07* (2006.01)

(52) U.S. Cl.
USPC ............ 417/395; 417/473; 137/625.69

(58) Field of Classification Search
USPC ........ 417/393, 395, 473; 137/625.66, 625.69
See application file for complete search history.

(56) References Cited

U.S. PATENT DOCUMENTS

| | | | | |
|---|---|---|---|---|
| 3,199,540 | A * | 8/1965 | Forster | 137/625.69 |
| 3,418,002 | A * | 12/1968 | Hennells | 277/584 |
| 3,565,115 | A * | 2/1971 | Beckett et al. | 137/625.69 |
| 5,195,878 | A * | 3/1993 | Sahiavo et al. | 417/393 |
| 5,273,074 | A * | 12/1993 | Conradt et al. | 137/625.64 |
| 5,558,506 | A * | 9/1996 | Simmons et al. | 417/393 |
| 5,893,707 | A * | 4/1999 | Simmons et al. | 417/393 |
| 6,814,553 | B2 * | 11/2004 | Watanabe et al. | 417/473 |
| 6,874,997 | B2 * | 4/2005 | Watanabe et al. | 417/395 |
| 7,458,309 | B2 * | 12/2008 | Simmons et al. | 91/230 |
| 8,568,114 | B2 * | 10/2013 | Masuda et al. | 417/473 |
| 2005/0191195 | A1 * | 9/2005 | Oniduka et al. | 417/473 |

* cited by examiner

*Primary Examiner* — Peter J Bertheaud
(74) *Attorney, Agent, or Firm* — Guice Patents PLLC

(57) ABSTRACT

The present invention relates to a separation type pneumatic dual partition membrane pump, which comprises a pump body and an external pneumatic control valve which is separately installed. Through the operation of the external pneumatic control valve, the main shaft of the pump body and the valve rod of the external pneumatic control valve are reciprocally moved, and the two partition membranes respectively generate stretch and compress motions for changing the volume of each liquid room in the pump body so as to perform the pump stroke and the liquid suction stroke to the liquid.

10 Claims, 6 Drawing Sheets

SEPARATION TYPE PNEUMATIC DUAL PARTITION MEMBRANE PUMP AND EXTERNAL PNEUMATIC CONTROL VALVE THEREOF

BACKGROUND OF THE INVENTION

1. Field of the Invention

The present invention relates to a pump, especially to a pneumatic dual partition membrane pump with a design of separated pump body and external pneumatic control valve. Moreover, the present invention further provides an external pneumatic control valve used in a pneumatic dual partition membrane pump.

2. Description of Related Art

A pump is a device for conveying or moving liquid, gas or special fluid medium, i.e. a machinery performing work to the fluid. The category of pump is complicated, if sorted by the means of applying pressure to fluid, pumps can be categorized into three types which are displacement pump, dynamic pump and electromagnetic pump. The displacement pump includes a reciprocal pump and rotation pump (rotor pump), the convey means is high pressure with small flow amount. The dynamic pump includes a centrifugal pump and vortex pump, the convey means is low pressure with large flow amount. The electromagnetic pump can be used to convey liquid conductive member.

For an electronic factory, for example a semiconductor fab processing etching to the wafer, strong acid or alkaline liquids are often used. However, there is a concern of polluting the liquid due to the cavitation or acid erosion occurred at the location where the blade wheel of dynamic pump is installed. As such, manufacturers in the relative arts have developed a pneumatic dual partition membrane pump totally made of an acid and alkaline resistant material, such as polytetrafluoroethylene (PTFE), for preventing the pump being eroded by the acid or alkaline liquid.

The above-mentioned pneumatic dual partition membrane pump is a displacement pump, in which a pump body is installed with a pressure control valve. The pneumatic dual partition membrane pump mainly utilizes the pressure control valve to drive a main shaft capable of reciprocally moving in the pump body, two side of the main shaft are installed full covered type partition membranes, each partition membrane divides two pump chambers into an air room and a liquid room which are independent from each other. When the high pressure air is supplied into a pump, the pressure control valve is enabled to operate and the main shaft is driven to reciprocally move, thus the two partition membranes are flexurally deformed at the same time to change the volume of each liquid room, thereby sucking in or pumping out liquid via the pressure difference.

With the reciprocal flexural deformation, the partition membrane may break due to elastic fatigue, therefore the partition membrane is seen as a consumable component due to the needs of replacement. What shall be addressed is that when the partition membrane breaks, the strong acid or alkaline liquid remained in the liquid room may flow along the internal pipeline and enter the pneumatic control valve, so the airtight component in the pneumatic control valve such as an O ring may be eroded, thus not only the liquid is polluted, the airtight effect of the pneumatic control valve may be damaged, and the whole set of pneumatic control valve has to be replaced. So for users, the costly replacement of pneumatic control valve is a disadvantage which shall be improved.

SUMMARY OF THE INVENTION

One primary object of the present invention is to provide a separation type pneumatic dual partition membrane pump, wherein a pump body and an external pneumatic control valve are designed to be separated, i.e. the pump body and the external pneumatic control valve are separately installed, and pipes are served to connect the above two, so when a partition membrane is broken, liquid remained in a liquid room is prevented from entering the external pneumatic control valve, thereby avoiding the damage of valve member and prolonging the service life.

For achieving the above-mentioned object, one solution provided by the present invention is to provide a separation type pneumatic dual partition membrane pump which comprises:

a pump body, pump chambers formed at two sides are respectively installed with a shaft hole for the installation of a main shaft, a liquid outlet channel having an outlet port, a liquid inlet channel having an inlet port, two sides of the liquid outlet and the liquid inlet channels adjacent to the pump chambers are respectively installed with a pair of check valves, and two ends of the main shaft are respectively fastened with a partition membrane for dividing each pump chamber into an air room and a liquid room; and two end covers respectively combined at one side of the pump body, the above-mentioned partition membranes are fastened between each end cover and the pump body, the two end covers are respectively formed with a first and a second air inlet apertures, and a first and a second main air passage apertures communicated with the air room, and the interiors of the first and the second air inlet apertures are respectively installed with a switch valve; and an external pneumatic control valve, a valve member thereof is formed with a main air inlet port and at least an air guide branch pipe communicated with the main air inlet port; a fixing sleeve pipe installed in the valve member, the surface thereof is radially installed with first, second, third, fourth, fifth air apertures spaced from each other, wherein the first to the fifth air apertures are respectively communicated with a first exhaust aperture, a first main air guide aperture, the main air inlet port, a second main air guide aperture and a second air exhaust aperture formed on the surface of the valve member, the inner wall of the fixing sleeve pipe is annularly installed with at least a first position slot in sequence provided with an inner airtight ring and a wear resistant ring; a valve rod installed in the fixing sleeve pipe and connected with the wear resistant ring, wherein the center and two sides thereof are respectively installed with a block ring, a first air guide slot communicating with the second and the third air apertures, and a second air guide slot communicating with the third and the fourth air apertures; and two lateral covers respectively connected to one side of the valve member, the two lateral covers are respectively installed with a communication pipe corresponding to the two sides of the air guide pipe, each communication pipe is respectively communicated with a first and a second air outlet apertures formed on the two lateral covers, a first and a second air outlet pipes are respectively connected between the first and the second air outlet apertures and the first and the second air inlet apertures, and a first and a second air guide pipes are respectively connected between the first and the second main air guide apertures and the first and the second main air passage apertures;

with the high pressure being introduced from the main air inlet port, the air pressure enables the control valve to operate, so the main shaft and the valve rod are reciprocally moved, and the two partition membranes respectively generate stretch and compress motions for changing the volume of each liquid room so as to perform the pump stroke and the liquid suction stroke to the liquid.

Another object of the present invention is to provide an external pneumatic control valve used in a pneumatic dual partition membrane pump, wherein an inner airtight ring fastened in a valve seat is provided with a wear resistant ring for increasing the wear resistant effect, thereby prolonging the service life of the pneumatic control valve.

For achieving the above-mentioned object, one solution provided by the present invention is to provide an external pneumatic control valve used in a separation type pneumatic dual partition membrane pump, which comprises:

a valve member, the surface thereof is formed with a main air inlet port, and the main air inlet port and the inner wall of the valve member are installed with at least an air guide branch pipe communicated with each other;

a fixing sleeve pipe installed in the valve member, the surface thereof is radially installed with first, second, third, fourth, fifth air apertures spaced from each other, wherein the first to the fifth air apertures are respectively communicated with a first exhaust aperture, a first main air guide aperture, the main air inlet port, a second main air guide aperture and a second air exhaust aperture, the inner wall of the fixing sleeve pipe is annularly installed with at least a first position slot in sequence provided with an inner airtight ring and a wear resistant ring;

a valve rod installed in the fixing sleeve pipe and connected with the wear resistant ring, wherein the center and two sides thereof are respectively installed with a block ring, a first air guide slot communicating with the second and the third air apertures, and a second air guide slot communicating with the third and the fourth air apertures; and two lateral covers respectively connected to one side of the valve member, the two lateral covers are respectively installed with a communication pipe corresponding to the two sides of the air guide branch pipe, each communication pipe is respectively communicated with a first and a second air outlet apertures formed on the two lateral covers, the first and the second air outlet apertures are respectively connected with a first and a second air outlet pipes, and the first and the second main air guide apertures are respectively connected with a first and a second air guide pipes.

DETAILED DESCRIPTION OF THE PREFERRED EMBODIMENT

As shown from FIG. 1 to FIG. 3b, the separation type pneumatic dual partition membrane pump provided by the present invention substantially comprises a pump body 10 and an external pneumatic control valve 20.

Figure 1:
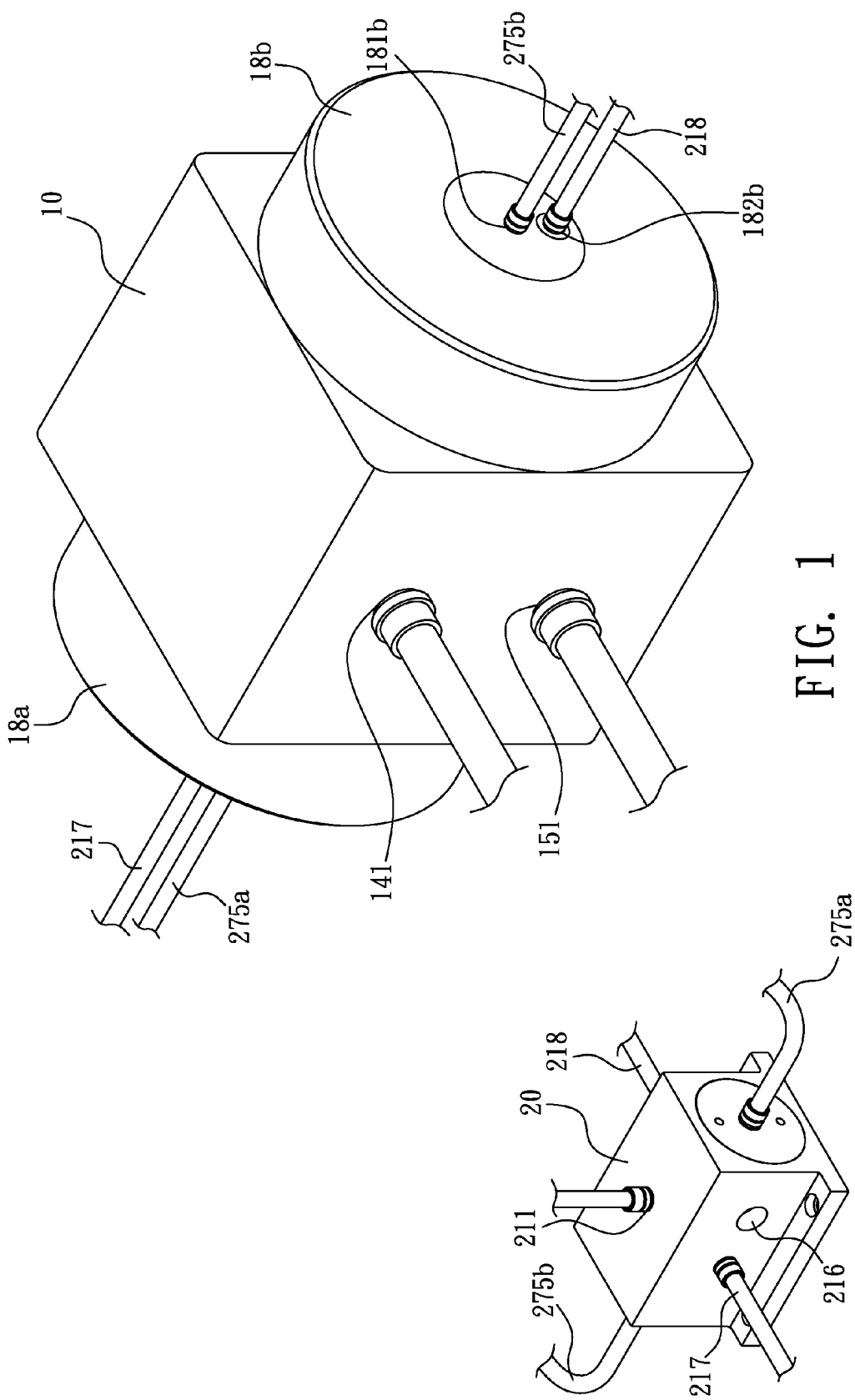
FIG. 1 is a perspective view illustrating the separation type pneumatic dual partition membrane pump, accord to the present invention.
Figure 3A:
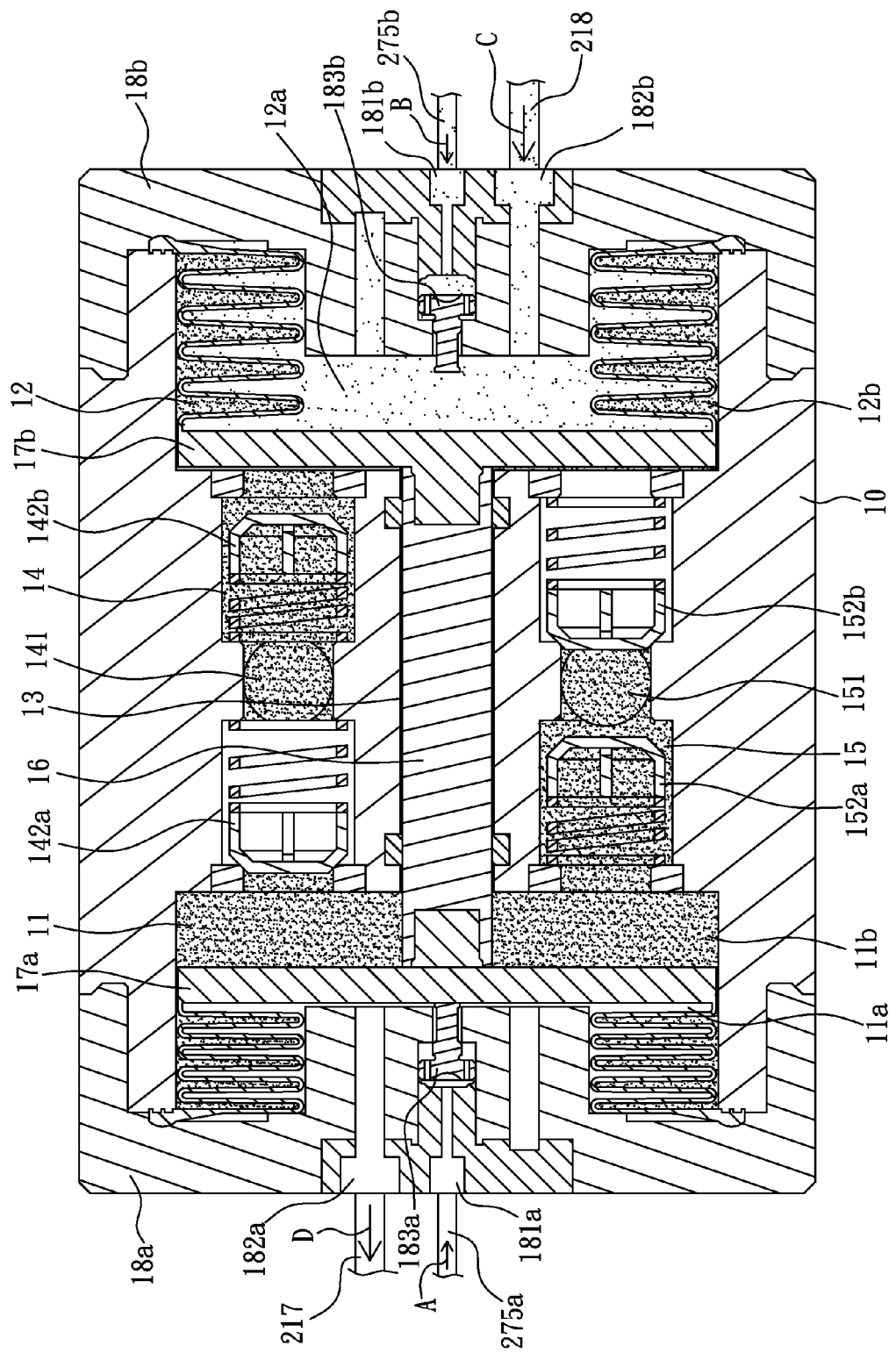
FIG. 3a and FIG. 3b are cross sectional views illustrating the main shaft and the valve rod being at the first position while the separation type pneumatic dual partition membrane pump being operated, according to the present invention.

Referring to FIG. 1 and FIG. 3a, the pump body 10 is configured by a conventional structure, therefore said structure is included in the scope of the present invention. The pump body 10 is made of an acid/alkaline resistant material, e.g. polytetrafluoroethylene (PTFE) or PTFE added with polyfluoroalkoxy (PFA), and two sides thereof are formed with a first pump chamber 11 and a second pump chamber 122 which are respectively and transversally installed with a shaft hole 13, a liquid outlet channel 14 and a liquid inlet channel 15 at the center. The shaft hole 13 is provided for the installation of a main shaft 16, and two ends of the main shaft 16 are respectively installed with a partition membrane 17a, 17b. The interiors of the liquid outlet channel 14 and the liquid inlet channel 15 are respectively formed with an outlet port 141 and an inlet port 151, and the locations where two ends of each channel 14, 15 being adjacent to the first and the second pump chambers 11, 12 are respectively installed with a pair of check valves 142a, 142b and 152a, 152b.

Two ends of the pump body 10 are respectively installed with an end cover 18a, 18b, and two ends of the pump body 10 are respectively fastened with the above-mentioned partition membranes 17a, 17b. With the installation of the partition membranes 17a, 17b, the first and the second pump chambers 11, 12 are respectively divided into a first and a second air rooms 11a, 12a, and a first and a second liquid rooms 11b, 12b. The two end covers 18a, 18b are respectively formed with a first and a second air inlet apertures 181a, 181b, and a first and a second main air passage apertures 182a, 182b communicating with the first and the second air rooms 11a, 12a, wherein the interiors of the first and the second air inlet apertures 181a, 181b are respectively installed with a first and a second switch valves 183a, 183b.

Figure 2:
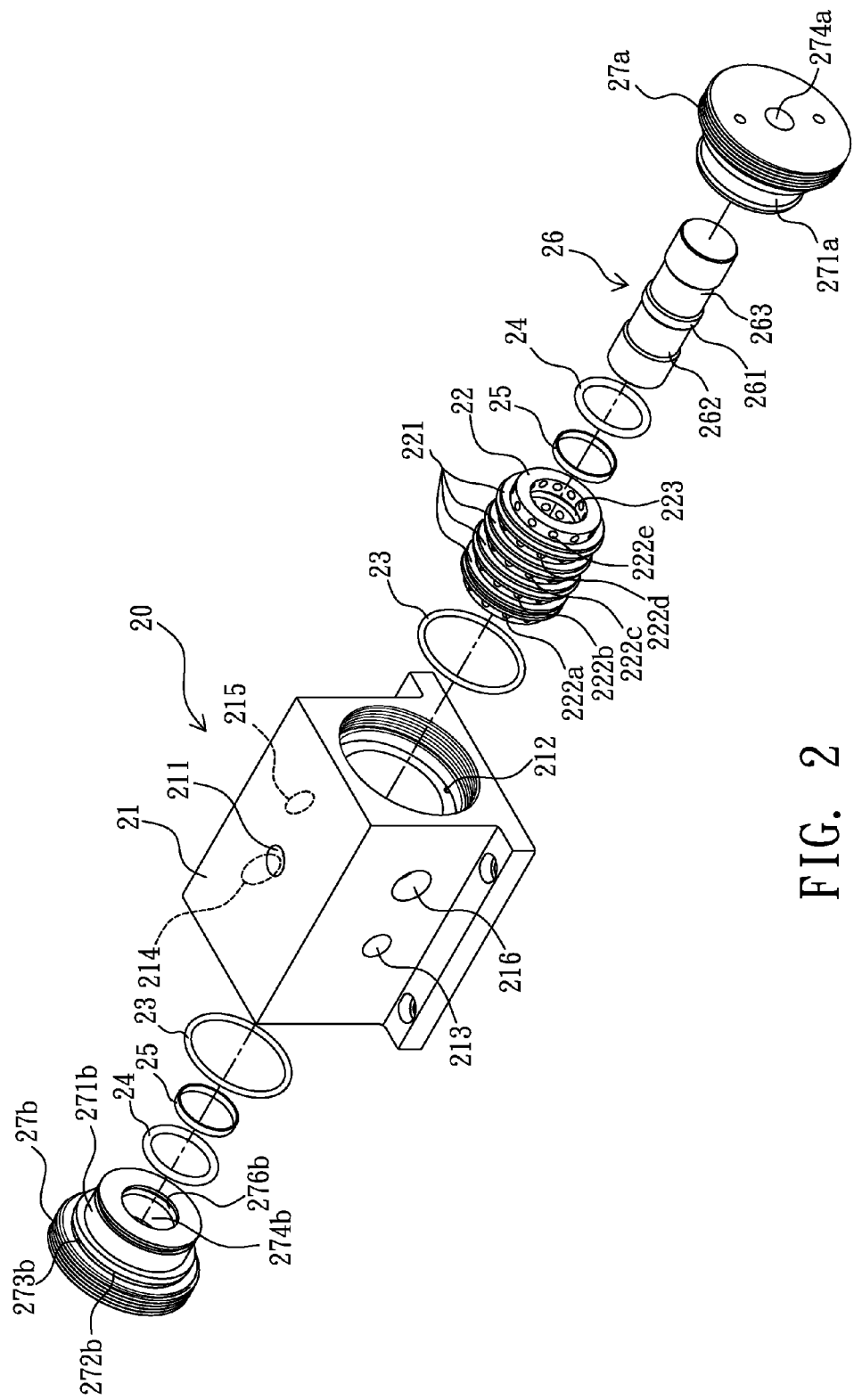
FIG. 2 is a perspective exploded view illustrating the external pneumatic control valve, according to the present invention.
Figure 3B:
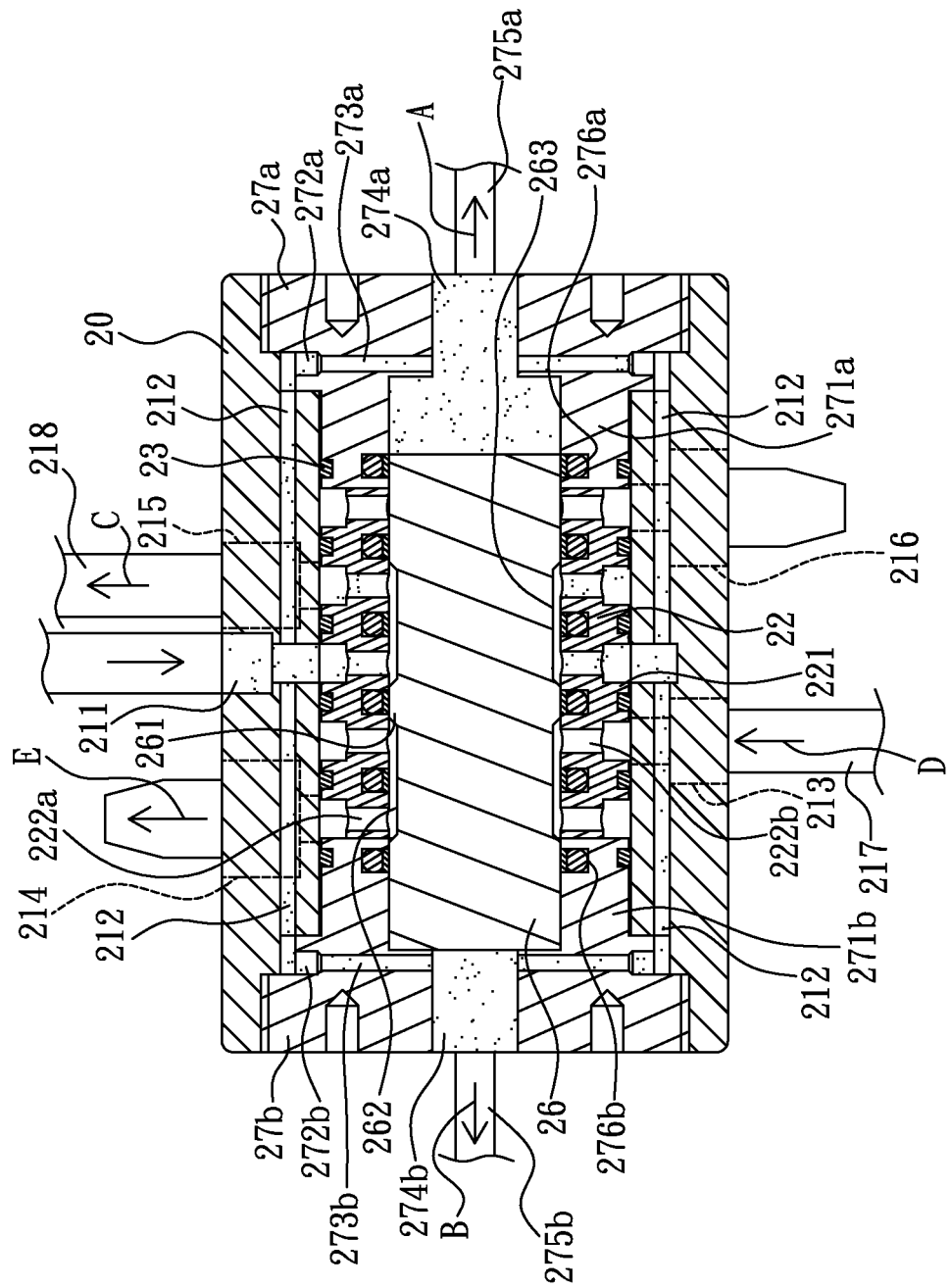

As shown in FIG. 1, the characteristic of the present invention is that the external pneumatic control valve 20 and the pump body 10 are separately installed. Referring to FIG. 1, FIG. 2 and FIG. 3b, a valve member 21 of the external pneumatic control valve 20 is formed with a main air inlet port 211 communicated with an air source, e.g. an air compressor, and the main air inlet port 211 and the inner wall of the valve member 21 are transversally installed with at least an air guide branch pipe 212 which are in communication with each other. In addition, at least one surface of the valve member 21 is further formed with a first main air guide aperture 213, a first air exhaust aperture 214, a second main air guide aperture 215 and a second air exhaust aperture 216. The first and the second main air guide apertures 213, 215 are communicated with the first and the second main air passage apertures 182a, 182b respectively via a first and a second air guide pipes 217, 218, such that the compressed air can be supplied to the pump body 10 and exhausted from the valve member 21.

Moreover, a fixing sleeve pipe 22 is installed in the valve member 21 and the surface of the fixing sleeve pipe 22 is annularly installed with four partition ribs 221, wherein each partition rib is installed with an outer airtight ring 23 adjacent to the inner wall of the fixing sleeve pipe 22, thereby forming a better airtight effect with the fixing sleeve pipe 22. The surface of the fixing sleeve pipe 22 is radially and in sequence formed with a row of first air apertures 222a, a row of second air apertures 222b, a row of third air apertures 222c, a row of fourth air apertures 222d and a row of fifth air apertures 222e which are annularly arrange and spaced from each other, for example formed at two ends or between two adjacent partition ribs 221, and the inner wall of each rib 221 is annularly installed with at least a first positioning slot 223 which is installed with an inner airtight ring 24 at the interior then further installed with a wear resistant ring 25 made of a wear resistant material such as Teflon, for increasing the wear resistant effect with a valve rod 26. The first and the fifth air apertures 222a, 222e are communicated with the first and the second air exhaust apertures 214, 215, the second and the fourth air apertures 222b, 222d are communicated with the first main air guide apertures 213, 215, and the third apertures 222c are communicated with the main air inlet port 211.

The above-mentioned valve rod 26 is disposed in the fixing sleeve pipe 22 and connected with the wear resistant ring 25, so the valve rod 26 is enabled to transversally and reciprocally move in the fixing sleeve pipe 22 and two lateral covers 27a, 27b. In addition, the center and two ends of the valve rod 26 are respectively installed with a block ring 261, a first air guide slot 262 and a second air guide slot 263. Lastly, flanges 271a, 271b of the two lateral covers 27a, 27b are combined at the openings at two ends of the valve member 21, so the inner edge of each flange 271a, 271b is adjacent to the fixing sleeve pipe 22, thereby fastening the fixing sleeve pipe 22 in the valve member 21.

The two flanges 271a, 271b are respectively formed with an annular concave slot 272a, 272b corresponding to the above-mentioned air guide branch pipes 212. Each concave slot 272a, 272b is longitudinally installed with a communication pipe 273a, 273b respectively communicated with a first and a second air outlet apertures 274a, 274b transversally formed on the two lateral covers 27a, 27b. As such, a part of the compressed air introduced from the main air inlet port 211 enters the air guide branch pipes 212, and enters the annular concave slots 272a, 272b and the communication pipes 273a, 273b of the two lateral covers 27a, 27b from two ends of each air guide branch pipe 212, then is discharged from the first and the second air outlet apertures 274a, 274b. The first and the second air outlet apertures 274a, 274b and the first and the second air inlet apertures 181a, 181b are connected respectively via a first and a second air outlet pipe 275a 275b, so the compressed air can be continuously discharged from the first and the second air outlet apertures 274a, 274b, and is allowed to pass through the first and the second air outlet pipes 275a, 275b for entering the first and the second air inlet apertures 181a, 181b.

The outer surfaces of the flanges 271a, 271b of the two lateral covers 27a, 27b are respectively installed with the above-mentioned outer airtight ring 23, and the first and the second air outlet apertures 274a, 274b axially formed on each flange 271a, 271b are served to allow the installation of the valve rod 26, and the inner wall is annularly formed with a second positioning slot 276a, 276b. The interior of each second positioning slot 276a, 276b is installed with an inner airtight ring 24 then further installed with the above-mentioned wear resistant ring 25 made of a wear resistant material such as Teflon, thereby increasing the wear resistant effect with the valve rod 26.

Referring to FIG. 3a and FIG. 3b, the air source is introduced from the main air inlet port 211 for entering the valve member 21 of the pneumatic control valve 20, at this moment, the valve rod 26 is located at a first position defined at the left side of the fixing sleeve pipe 22 and the lateral cover 27b, and the block ring 261 is disposed below the second partition rib 221, the third and the fourth air apertures 222c, 222d are communicated through the second air guide slot 263, so the compressed air is allowed to pass through the third and the fourth air apertures 222c, 222d and the second main air guide aperture 215 for entering the second air guide pipe 218, and pass through the second main air passage aperture 182b along an arrow C direction for entering the second air room 12a of the second pump chamber 12.

Meanwhile, the partition membrane 17b at the right side is pressed to stretch towards left for forming a pump stroke, so the liquid in the second liquid room 12b is pressed to pass through the check valve 142b, which is in an opened state, of the liquid outlet channel 14, and discharged from the outlet port 141. Because the two partition membranes 17a, 17b are connected by the main shaft 16, when the partition membrane 17b at the right side is pushed towards left for pumping the liquid, the main shaft 16 is displaced to allow the partition membrane 17a at the left side to be retracted towards left, thereby performing an opposite liquid suction stroke, so the liquid is introduced into the first liquid room 11b through the inlet port 151 of the liquid inlet channel 15, and the liquid passes through the opened check valve 152a for allowing the first liquid room 11b to be filled with liquid.

During the above-mentioned pump stroke and the liquid suction stroke, a part of the compressed air is enabled to pass through the communication pipes 273a 273b of the two lateral covers 27a, 27b through the air guide branch pipes 212 communicated with the main air inlet port 211, and respectively enter the first and the second air outlet pipes 275a, 275b through the first and the second air outlet apertures 274a, 274b, then enter the first and the second air inlet apertures 181a, 181b respectively along an arrow A and arrow B directions. Because the two air inlet apertures are sealed by the first and the second switch valves 183a, 183b, the first and the second air outlet apertures 274a, 274b are in an equal pressure state with the first and the second air inlet apertures 181a, 181b.

When the partition membrane 17a at the left side is pushed towards left by the main shaft 16 to be in contact and open the first switch valve 183a, the compressed in the first air inlet aperture 181a is allowed to pass through the first switch valve 183a along the arrow A direction, and is squeezed with the air in the first air room 11a by the partition membrane 17a at the left side for being discharged from the first main air passage aperture 182a to pass through the first air guide pipe 217, the first main air guide aperture 213, the second and the first air apertures 222b, 222a along an arrow D direction, then is exhausted from the first air exhaust aperture 214 along an arrow E direction. As such, an instant pressure drop is formed from the first air outlet aperture 274a to the first air inlet aperture 181a, thus the pressure is smaller than the pressure formed from the second air outlet aperture 274b to the second air inlet aperture 181b, thereby pushing the valve rod 26 towards right to a second position as shown in FIG. 4b.

Figure 4A:
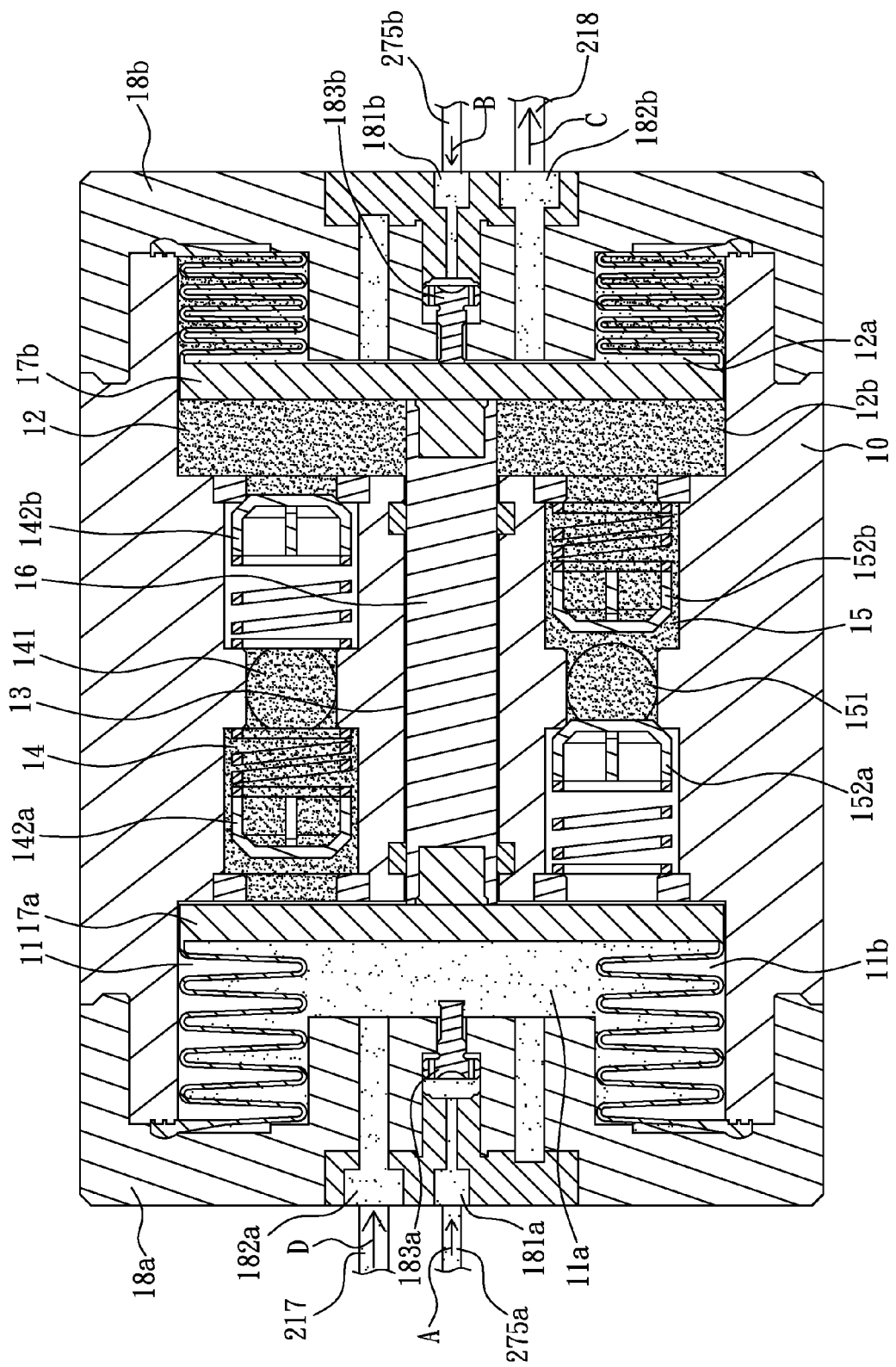
FIG. 4a and FIG. 4b are cross sectional views illustrating the main shaft and the valve rod being at the second position while the separation type pneumatic dual partition membrane pump being operated, according to the present invention.
Figure 4B:
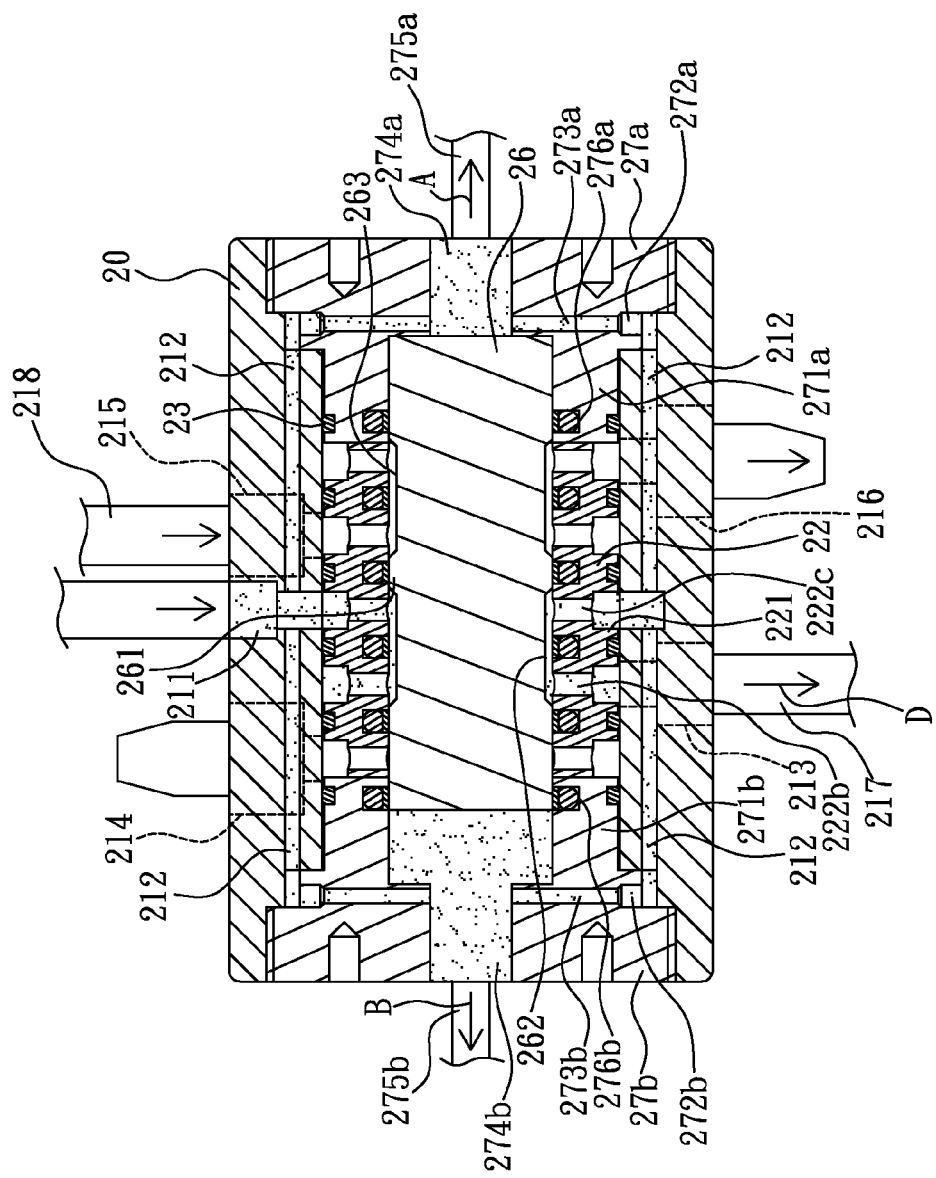

Referring to FIG. 4a and FIG. 4b, the valve rod 26 has been moved to the second position defined at the right side of the fixing sleeve pipe 22 and the first lateral cover 27a, and the block ring 261 has been moved to a location below the third partition rib 221 thereby communicating the second and the third air apertures 222b, 222c, and the compressed air is allowed to pass through the third air apertures 222c, the first air guide slot 262, the second air apertures 222b, the first main air guide aperture 213 for entering the first air guide pipe 217, and pass through the first main air passage aperture 182a along an arrow D direction for entering the first air room 11a of the first pump chamber 11.

Meanwhile, the partition membrane 17a at the left side is pressed to stretch towards right for forming a pump stroke, so the liquid in the first liquid room 11b is pressed to pass through the check valve 142a, which is in an opened state, of the liquid outlet channel 14, and discharged from the outlet port 141. The partition membrane 17b at the right side is retracted towards right, thereby performing an opposite liquid suction stroke, so the liquid is introduced into the second liquid room 12b through the inlet port 151 of the liquid inlet channel 15, and the liquid passes through the opened check valve 152b for allowing the second liquid room 12b to be filled with liquid.

When the partition membrane 17b at the right side is pushed towards right by the main shaft 16 to be in contact and open the second switch valve 183b, the compressed air in the second air inlet aperture 181b is allowed to pass through the second switch valve 183b along the arrow B direction, and is squeezed with the air in the second air room 12a by the partition membrane 17b at the right side for being exhausted from the second main air passage aperture 182b to pass through the second air guide pipe 218, the second main air guide aperture 215, the fourth and the fifth air apertures 222d, 222e along the arrow C direction, then is exhausted from the second air exhaust aperture 216 along an arrow F direction. As such, an instant pressure drop is formed from the second air outlet aperture 274b to the second air inlet aperture 181b, thus the pressure is smaller than the pressure formed from the first air outlet aperture 274a to the first air inlet aperture 181a, thereby pushing the valve rod 26 towards right to the first position as shown in FIG. 3b. As such, through the pump body 10 and the external pneumatic control valve 20 repeatedly performing the above-mentioned operations, the pump chambers 11, 12 at two sides are enabled to alternatively perform the pump and the liquid suction strokes for achieving the work of conveying liquid through the pump.

The advantages of the present invention are: the external pneumatic control valve and the pump body are separately installed, and two air outlet pipes and two air guide pipes are installed therebetween, so if the partition membrane in the pump body is broken, the strong acid or alkaline liquid remained in the liquid room is prevented from entering the external pneumatic control valve; moreover, the fixing sleeve pipe and the positioning slots of the two lateral covers of the external pneumatic control valve are in sequence installed with the inner airtight ring and the wear resistant ring for enhancing the wear resistant effect of the valve rod, thereby further increasing the service life of the pneumatic control valve.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A separation type pneumatic dual partition membrane pump, comprising:
a pump body, pump chambers formed at two sides being respectively installed with a shaft hole for the installation of a main shaft, a liquid outlet channel having an outlet port, a liquid inlet channel having an inlet port, two sides of said liquid outlet and said liquid inlet channels adjacent to said pump chambers being respectively installed with a pair of check valves, and two ends of said main shaft being respectively fastened with a partition membrane for dividing each pump chamber into an air room and a liquid room; and two end covers respectively combined at one side of said pump body, said above-mentioned partition membranes being fastened between each end cover and said pump body, said two end covers being respectively formed with a first and a second air inlet apertures, and a first and a second main air passage apertures communicated with said air room, the interiors of said first and said second air inlet apertures being respectively installed with a switch valve; and
an external pneumatic control valve, a valve member thereof being formed with a main air inlet port and at least an air guide branch pipe communicated with said main air inlet port; a fixing sleeve pipe installed in said valve member, the surface thereof being radially installed with first, second, third, fourth, fifth air apertures spaced from each other, wherein said first to the fifth air apertures being respectively communicated with a first exhaust aperture, a first main air guide aperture, said main air inlet port, a second main air guide aperture and a second air exhaust aperture formed on the surface of said valve member, the inner wall of said fixing sleeve pipe being annularly installed with at least a first position slot in sequence provided with an inner airtight ring and a wear resistant ring; a valve rod installed in said fixing sleeve pipe and connected with said wear resistant ring, wherein the center and two sides thereof being respectively installed with a block ring, a first air guide slot communicating with said second and said third air apertures, and a second air guide slot communicating with said third and said fourth air apertures; and two lateral covers respectively connected to one side of said valve member, said two lateral covers being respectively installed with a communication pipe corresponding to the two sides of said air guide branch pipe, each communication pipe being respectively communicated with a first and a second air outlet apertures formed on said two lateral covers, a first and a second air outlet pipes being respectively connected between said first and said second air outlet apertures and said first and said second air inlet apertures, and a first and a second air guide pipes being respectively connected between said first and said second main air guide apertures and said first and said second main air passage apertures;
with the high pressure being introduced from the main air inlet port, the air pressure enabling the control valve to operate, so the main shaft and the valve rod being reciprocally moved, and the two partition membranes respectively generating stretch and compress motions for changing the volume of each liquid room so as to perform the pump stroke and the liquid suction stroke to the liquid.

2. The separation type pneumatic dual partition membrane pump as claimed in claim 1, wherein the surface of said fixing sleeve pipe is annularly installed with a plurality of partition ribs, and each partition rib is provided with an outer airtight ring adjacent to the inner wall of said fixing sleeve pipe.

3. The separation type pneumatic dual partition membrane pump as claimed in claim 1, wherein said two lateral covers are combined at openings defined at two ends of said valve member, so the inner edge of each flange is adjacent to said fixing sleeve pipe, thereby fastening said fixing sleeve pipe in said valve member.

4. The separation type pneumatic dual partition membrane pump as claimed in claim 3, wherein the outer surface of said flange of each lateral cover is further provided with an outer airtight ring, and said first and the second air outlet apertures axially formed on each flange are sleeved with said valve rod, then the inner wall of said flange is annularly installed with a second positioning slot in sequence provided with an inner airtight ring and a wear resistant ring.

5. The separation type pneumatic dual partition membrane pump as claimed in claim 3, wherein said flange of each lateral cover is installed with an annular concave slot corresponding to the location of said air guide branch pipe, and said communication pipe is longitudinally installed in said annular concave slot.

6. An external pneumatic control valve used in a separation type pneumatic dual partition membrane pump, comprising:
- a valve member, the surface thereof being formed with a main air inlet port, and said main air inlet port and the inner wall of said valve member being installed with at least an air guide branch pipe communicated with each other;
- a fixing sleeve pipe installed in said valve member, the surface thereof being radially installed with first, second, third, fourth, fifth air apertures spaced from each other, wherein said first to said fifth air apertures being respectively communicated with a first exhaust aperture, a first main air guide aperture, said main air inlet port, a second main air guide aperture and a second air exhaust aperture, the inner wall of said fixing sleeve pipe being annularly installed with at least a first position slot in sequence provided with an inner airtight ring and a wear resistant ring;
- a valve rod installed in said fixing sleeve pipe and connected with said wear resistant ring, wherein the center and two sides thereof being respectively installed with a block ring, a first air guide slot communicating with said second and said third air apertures, and a second air guide slot communicating with said third and said fourth air apertures; and
- two lateral covers respectively connected to one side of said valve member, said two lateral covers being respectively installed with a communication pipe corresponding to the two sides of said air guide branch pipe, each communication pipe being respectively communicated with a first and a second air outlet apertures formed on said two lateral covers, said first and said second air outlet apertures being respectively connected with a first and a second air outlet pipes, and said first and said second main air guide apertures being respectively connected with a first and a second air guide pipes.

7. The external pneumatic control valve used in a separation type pneumatic dual partition membrane pump as claimed in claim 6, wherein the surface of said fixing sleeve pipe is annularly installed with a plurality of partition ribs, and each partition rib is provided with an outer airtight ring adjacent to the inner wall of said fixing sleeve pipe.

8. The external pneumatic control valve used in a separation type pneumatic dual partition membrane pump as claimed in claim 6, wherein said two lateral covers are combined at openings defined at two ends of said valve member, so the inner edge of each flange is adjacent to said fixing sleeve pipe, thereby fastening said fixing sleeve pipe in said valve member.

9. The external pneumatic control valve used in a separation type pneumatic dual partition membrane pump as claimed in claim 8, wherein the outer surface of said flange of each lateral cover is further provided with an outer airtight ring, and said first and said second air outlet apertures axially formed on each flange are sleeved with said valve rod, then the inner wall of said flange is annularly installed with a second positioning slot in sequence provided with an inner airtight ring and a wear resistant ring.

10. The external pneumatic control valve used in a separation type pneumatic dual partition membrane pump as claimed in claim 8, wherein said flange of each lateral cover is installed with an annular concave slot corresponding to the location of said air guide branch pipe, and said communication pipe is longitudinally installed in said annular concave slot.

* * * * *